United States Patent

[11] 3,613,853

| [72] | Inventors | Harley E. Linthicum;<br>William B. Bronne, both of Springfield, Ohio |
|---|---|---|
| [21] | Appl. No. | 854,670 |
| [22] | Filed | Sept. 2, 1969 |
| [45] | Patented | Oct. 19, 1971 |
| [73] | Assignee | Carrier Corporation<br>Syracuse, N.Y. |

[54] ROTARY SHAFT TORQUE-LIMITING DEVICE
8 Claims, 6 Drawing Figs.

[52] U.S. Cl. ..................................................... 192/150,
74/785, 81/52.4, 173/12
[51] Int. Cl. ..................................................... B25b 23/14,
F16h 57/10
[50] Field of Search ............................................. 192/150;
74/751, 785, 781, 789; 81/52.4; 173/12

[56] References Cited
UNITED STATES PATENTS

| 2,180,474 | 11/1939 | Leece ........................... | 74/785 |
|---|---|---|---|
| 2,403,094 | 7/1946 | Lear ............................. | 74/751 X |
| 2,420,553 | 5/1947 | Morrill ......................... | 74/785 |
| 2,764,272 | 9/1956 | Reynolds ...................... | 192/150 |
| 2,791,141 | 5/1957 | Johnson et al. ............... | 81/52.4 |
| 2,812,677 | 11/1957 | Paterson ....................... | 81/52.4 |

FOREIGN PATENTS

| 832,588 | 2/1952 | Germany ...................... | 74/785 |
|---|---|---|---|

Primary Examiner—Carlton R. Croyle
Assistant Examiner—Thomas C. Perry
Attorneys—Harry G. Martin, Jr. and J. Raymond Curtin ABSTRACT: A torque controlled air tool employing a planetary gear set, one element of which is held stationary by magnetic means. A snap action of the linkage between the magnet and the stationary element is obtained when the force exerted on the stationary element exceeds the magnetic holding force, the snap action of the linkage being utilized to shut off the air supply to the tool.

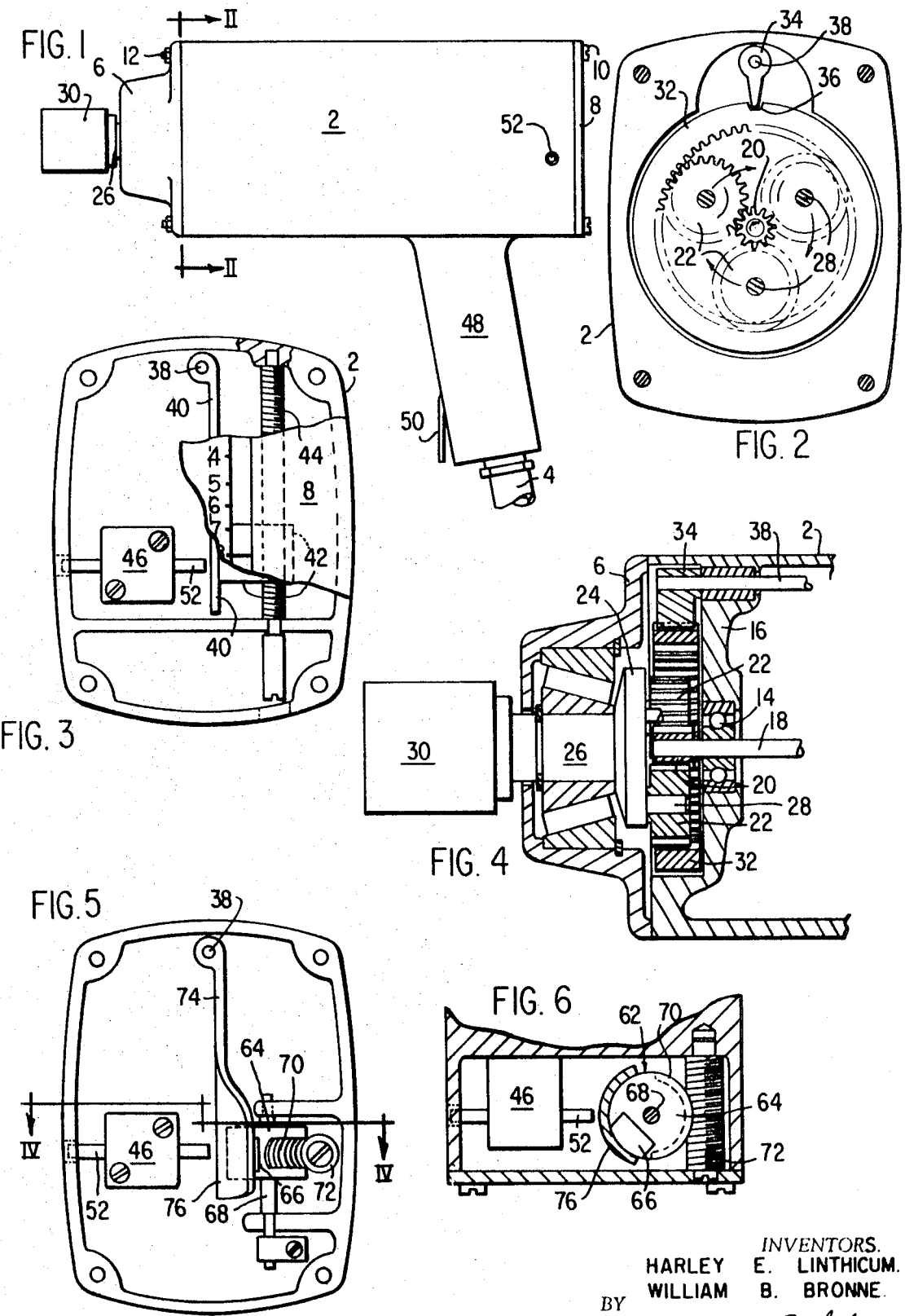

ROTARY SHAFT TORQUE-LIMITING DEVICE

BACKGROUND OF THE INVENTION

In many devices such as power wrenches, drilling equipment, tube expanders, etc., it is desirable to accurately limit the maximum torque applied by the device to prevent damage to the workpiece, the tool, or in the case of tube expansion, to control the degree of metal deformation. Numerous mechanisms have been devised to accomplish this purpose. However, most of the devices employ a friction device or spring means to limit maximum torque. Due to wear and rough handling, these devices either are not accurate enough or do not remain accurate enough for fine tolerance work. This is especially true in devices which must control maximum torque to within 1 inch/pound.

SUMMARY OF THE INVENTION

This invention relates to mechanism for use with a rotary shaft employing a planetary gear set to transmit power. The ring gear of the gear set is held stationary by magnetic means until a predetermined torque loading, measured by the reactive force of the planet gears on the ring gear, is exceeded. Movement of the ring gear is utilized to stop the rotary shaft to prevent the transmission of excessive torque by the shaft.

BRIEF DESCRIPTION OF THE DRAWINGS

FIG. 1 is a side elevation of an air tool embodying the torque control device of the present invention;

FIG. 2 is a view taken along line II—II of FIG. 1;

FIG. 3 is a rear view of the tool of FIG. 1 with a portion of the end cap removed;

FIG. 4 is a sectional view of the front portion of the tool of FIG. 1;

FIG. 5 is a view similar to FIG. 3 illustrating a second embodiment of the magnetic force adjusting mechanism; and FIG. 6 is a partial sectional view taken along line VI—VI of FIG. 5.

DESCRIPTION OF THE PREFERRED EMBODIMENT

Referring to the drawing, there is illustrated an air tool having a housing 2 adapted for connection to a source of high pressure air (not shown) by means of a flexible hose 4. The tool is provided with a front plate 6 and a back plate 8, suitably affixed to the housing as by bolts 10 and nuts 12. A suitable air motor (not shown) is disposed within housing 2. A front bearing 14, mounted in partition member 16 is provided to support motor shaft 18 for rotation therein. It should be understood that suitable bearings (not shown) are also provided to support the other end of shaft 18.

Power is transmitted from sun gear 20 which is mounted on shaft 18, through planet gears 22 and planet gear carrier 24 to output shaft 26 which forms part of carrier 24. Gears 22 are freely rotatable on shafts 28 which also form part of carrier 24. A coupling member 30 is affixed to shaft 26 for attachment of the device to be driven by the air tool such as a tube expander. A ring gear 32, adapted for engagement with planet gears 22, is mounted within partition 16 for rotation relative thereto. A lever 34, adapted for engagement in slot 36 of ring gear 32 is suitably affixed to a shaft 38. Shaft 38 which extends from the front portion to the back portion of the tool is mounted within housing 2 for rotation relative thereto.

Referring to FIG. 3, there is illustrated a lever 40 affixed to shaft 38. A magnet assembly 42, disposed alongside lever 40, is mounted on adjustment shaft 44. Shaft 44 is journaled within housing 2 for rotation relative thereto. Shaft 44 is threaded for engagement with mating threads in magnet assembly 42 for movement of assembly 42 along shaft 44 upon rotation of the shaft. It can be seen from FIG. 3 that movement of magnet assembly 42 along shaft 44 will position the magnet assembly along lever 40 to vary the effective length of lever 40 between magnet assembly 42 and lever pivot 38. A suitable on-off air valve 46 is mounted in housing 2 on the side of lever 40 opposite magnet assembly 42 for reasons to be hereinafter explained. Valve 46 is interconnected to a second valve (not shown) within handle portion 48 of housing 2. The valve within handle portion 48 is provided with hand lever 50, depression of lever 50 providing communication between air supply line 4 and the air motor within housing 2 when valve 46 is in the "on" position.

Considering the operation of the air tool heretofore described, depression of lever 50 will actuate the air motor, causing rotation of shaft 18 and gear 20. Magnet assembly 42 will hold lever 40, shaft 38, lever 34, and ring gear 32 stationary. Rotation of gear 20 will therefore cause gears 22 to rotate within ring gear 32 about gear 20 in a planetary fashion, thereby rotating carrier 24, output shaft 26, and coupling 30. As the torque loading on shaft 26 and carrier 24 increases, an increasing reactive force will be transmitted to ring gear 32. This force will be transmitted through lever 34 and shaft 38 to lever 40. When the force on lever 40 is sufficient to overcome the attractive force of magnet assembly 42, lever 40 will snap away from magnet 42 and move control rod 52 of valve 46 to the left, cutting off the supply of air to the tool motor. The left end of rod 52 will project outwardly from housing 2 when the valve 46 is in the "off" position. By adjusting the position of magnet 42 relative to shaft 38, the effective length of lever 40 may be varied which will vary the amount of torque on ring gear 32 necessary to cause lever 40 to snap away from magnet 42. Once the desired torque is reached and the tool is removed from the workpiece, valve 46 may be opened by manual displacement of rod 52 to the right.

A second embodiment of the invention, illustrated in FIGS. 5 and 6 employs a rotatable magnet assembly 62 rather than the sliding magnet assembly 42 illustrated in FIG. 3. Magnet assembly 62 is comprised of a nonmagnetic cylindrical block 64 having a magnetic portion 66 mounted therein. The magnet assembly is mounted for rotation on a shaft 68. Gear teeth 70 are formed in cylindrical block 64 for mating engagement with adjustment screw 72 which is rotatably mounted within housing 2. A lever arm 74, which is affixed to shaft 38, is provided with a lower portion 76 having a semicircular cross section for mating engagement with cylindrical block 64. By rotating block 64 about shaft 66, the contact area between magnetic portion 66 and lever arm 74 may be adjusted. This will determine the torque necessary to move lever arm 74 from magnet assembly 62, thereby moving control rod 52 of valve 46 to the left to cut off the supply of air to the tool motor. By utilizing magnetic means to hold the ring gear stationary below the preselected maximum torque, a snap-action shut off of the tool is obtained. This provides an extremely accurate and constant torque limit. Due to the permanence of ceramic magnets and the minimal number of friction points in the control, an extremely simple and accurate torque limiting control having minimal wear characteristics is provided.

While we have described a preferred embodiment of the invention, it is to be understood the invention is not limited thereto since it may be otherwise embodied within the scope of the following claims.

We claim:

1. A torque-control mechanism for use with a rotary shaft comprising:

a planetary gear set including first, second and third members, the first member of said gear set being the driven member and the second member of said gear set being a driving member;

lever means operably connected to the third member of said gear set; and magnetic means, adapted to engage said lever means to maintain said lever means stationary and prevent rotation of the third member of said gear set until the reactive force between the third member of said gear set and the second member of said gear set exceeds the magnetic force exerted on said lever means by said magnetic means, thereby disengaging said lever means from said magnetic means.

2. A torque control mechanism according to claim 1 wherein said lever means includes a pivotal lever, said magnetic means being adjustable in a plane parallel to said lever to vary the distance of said magnetic means from the lever pivot point for adjusting the effective length of said lever and therefore the reactive force between the third member of said gear set and the second member to said gear at necessary to disengage said pivotal lever from said magnetic means.

3. A torque control mechanism for use with a rotary shaft comprising;
   a planetary gear set including first, second, and third members, the first member of said gear set being the driven member and the second member of said gear set being a driving member;
   lever means operably connected to the third member of said gear set;
   magnetic means operably associated with said lever means to engage said lever means and maintain the third member of said gear set stationary until the reactive force between the third member of said gear set and the second member of said gear set exceeds the magnetic force exerted by said magnetic means on said lever means, said lever means including a pivotal lever, said magnetic means including a block of nonmagnetic material having a magnet disposed therein, said block being adjustable relative to said lever to vary the area of contact between said lever and said magnet and therefore the reactive force between the third member of said gear set and the second member of said gear set necessary to disengage said pivotal lever from said magnetic means.

4. A torque-controlled tool comprising a housing;
   a motor disposed in said housing;
   a planetary gear set having first, second, and third members disposed in said housing, the first member of said gear set being driven by said motor, the second member of said gear set being adapted to drive a rotary tool;
   lever means operably connected to the third member of said gear set; and
   magnetic means, adapted to engage said lever means to maintain said lever means stationary and prevent rotation of the third member of said gear set until the reactive force between the third member of said gear set and the second member of said gear set exceeds the magnetic force exerted on said lever means by said magnetic means, thereby disengaging said lever means from said magnetic means.

5. A torque-controlled tool according to claim 4 wherein the third member of said gear set is a ring gear having a slot formed therein;
   said lever means including a shaft journaled in said housing parallel to the axis of said motor; and
   a lever affixed to one end of said shaft adapted for engagement with the slot in said ring gear, said magnetic means maintaining said lever means stationary thereby preventing rotation of said ring gear.

6. A torque-controlled tool according to claim 5 further including a second lever affixed to the other end of said shaft, and,
   control means disposed opposite the free end of said second lever, contact of said control means by said lever shutting off the supply of power to said motor, said magnetic means being disposed on the side of said second lever opposite said control means and being adapted to hold said second lever stationary until the reactive force between said ring gear and said second member exceeds the magnetic force, thereby causing said second lever to break away from said magnetic means and contact said control means to stop said motor.

7. A torque-controlled tool according to claim 6 wherein said magnetic means includes a block of nonmagnetic material having a magnet disposed therein, said block being adjustable relative to said second lever to vary the area of contact between said lever and said magnet and therefore the reactive force between the driving member of said gear set and said ring gear necessary to break said lever away from said magnet.

8. A torque-controlled tool comprising a housing, a motor disposed in said housing, a planetary gear set having first, second, and third members disposed in said housing, the first member of said gear set being driven by said motor, the second member of said gear set being adapted to drive a rotary tool, the third member of said gear set being a ring gear having a slot formed therein;
   a shaft journaled in said housing parallel to the axis of said motor;
   a lever affixed to one end of said shaft adapted for engagement with the slot in said ring gear;
   a second lever affixed to the other end of said shaft;
   control means disposed opposite the free end of said second lever, contact of said control means by said lever shutting off the supply of power to said motor;
   magnetic means disposed on the side of said second lever opposite said control means and being adapted to hold said second lever stationary until the reactive force between the ring gear and the driving member of the gear set exceeds the force exerted by said magnetic means on said second lever, thereby causing said second lever to disengage from said magnetic means and contact said control means to stop said motor, said magnetic means being adjustable in a plane parallel to said second lever to vary the distance of said magnetic means from said shaft for adjusting the effective length of said second lever and therefore the reactive force between the driving member of said gear set and said ring gear necessary to break said second lever away from said magnetic means.

UNITED STATES PATENT OFFICE
CERTIFICATE OF CORRECTION

Patent No. 3,613,853           Dated October 19, 1971

Inventor(s) HARLEY E. LINTHICUM & WILLIAM B. BRONNE

It is certified that error appears in the above-identified patent and that said Letters Patent are hereby corrected as shown below:

Column 3, line 7, (first occurrence) "to" should read --of--

Column 3, line 7, "at" should read --set--

Signed and sealed this 16th day of May 1972.

(SEAL)
Attest:

EDWARD M. FLETCHER, JR.           ROBERT GOTTSCHALK
Attesting Officer           Commissioner of Patents